United States Patent
Kim et al.

(10) Patent No.: US 11,194,603 B2
(45) Date of Patent: Dec. 7, 2021

(54) USER EQUIPMENT, SERVER, CONTROL METHOD OF THE USER EQUIPMENT AND CONTROL METHOD OF THE SERVER FOR PERFORMING AHEAD-OF-TIME (AOT) COMPILATION OF AN APPLICATION BASED ON USAGE FREQUENCY

(71) Applicant: SAMSUNG ELECTRONICS CO., LTD., Suwon-si (KR)

(72) Inventors: Back Ki Kim, Suwon-si (KR); Jung Woo Lee, Suwon-si (KR); Jong Min Kim, Suwon-si (KR); Sung Hee Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 6 days.

(21) Appl. No.: 16/674,088

(22) Filed: Nov. 5, 2019

(65) Prior Publication Data

US 2020/0159554 A1 May 21, 2020

(30) Foreign Application Priority Data

Nov. 16, 2018 (KR) .................. 10-2018-0141513

(51) Int. Cl.
*G06F 9/455* (2018.01)
*G06F 8/41* (2018.01)
*G06F 8/60* (2018.01)
*G06F 12/0862* (2016.01)

(52) U.S. Cl.
CPC ............ *G06F 9/45516* (2013.01); *G06F 8/41* (2013.01); *G06F 8/60* (2013.01); *G06F 12/0862* (2013.01); *G06F 2212/1021* (2013.01); *G06F 2212/602* (2013.01)

(58) Field of Classification Search
CPC .. G06F 9/45516; G06F 8/416; G06F 12/0862; G06F 2212/602; G06F 2212/1021
USPC .................................. 717/140–148
See application file for complete search history.

(56) References Cited

U.S. PATENT DOCUMENTS

| 6,110,226 A | * | 8/2000 | Bothner | ............. G06F 9/45516 717/153 |
| 6,151,703 A | * | 11/2000 | Crelier | ................... G06F 9/449 717/136 |
| 6,295,642 B1 | * | 9/2001 | Blandy | .............. G06F 9/45516 717/148 |

(Continued)

FOREIGN PATENT DOCUMENTS

| KR | 10-2011-0081720 A | 7/2011 |
| KR | 10-2017-0071360 A | 6/2017 |

OTHER PUBLICATIONS

Oh et al, "Bytecode to C Ahead of Time Compilation for Android Dalvik Virtual Machine", IEEE, pp. 1048-1053 (Year: 2015).*

(Continued)

*Primary Examiner* — Anil Khatri
(74) *Attorney, Agent, or Firm* — Sughrue Mion, PLLC

(57) ABSTRACT

According to embodiments of the disclosure, a UE, a server, a control method of the UE, and a control method of the server may be provided to efficiently use storage space of the UE by performing AOT compilation based on the usage frequency of an application and function by a user and managing the AOT compiled machine code.

19 Claims, 12 Drawing Sheets

(56) References Cited

U.S. PATENT DOCUMENTS

| | | | | |
|---|---|---|---|---|
| 6,317,873 | B1* | 11/2001 | Townsend | G06F 8/53 717/142 |
| 6,321,377 | B1* | 11/2001 | Beadle | G06F 9/45516 717/148 |
| 6,324,686 | B1* | 11/2001 | Komatsu | G06F 8/443 717/118 |
| 6,332,216 | B1* | 12/2001 | Manjunath | G06F 8/48 717/141 |
| 6,530,075 | B1* | 3/2003 | Beadle | G06F 8/443 717/114 |
| 6,604,167 | B1* | 8/2003 | Blandy | G06F 9/45516 711/100 |
| 6,904,594 | B1* | 6/2005 | Berry | G06F 11/3404 717/130 |
| 7,032,216 | B1* | 4/2006 | Nizhegorodov | G06F 8/454 717/140 |
| 7,174,544 | B2* | 2/2007 | Zee | G06F 8/41 717/136 |
| 7,213,240 | B2* | 5/2007 | Wong | G06F 8/443 717/148 |
| 7,496,897 | B1* | 2/2009 | Dibble | G06F 9/45504 714/39 |
| 7,562,353 | B2* | 7/2009 | Bedner | G06F 8/76 717/118 |
| 7,587,712 | B2* | 9/2009 | Mountain | H04W 8/245 709/203 |
| 8,201,426 | B2* | 6/2012 | Heim | E05G 1/026 70/63 |
| 8,458,670 | B2* | 6/2013 | Day | G06F 9/445 717/130 |
| 8,473,935 | B2* | 6/2013 | Grice | G06F 8/48 717/151 |
| 9,038,038 | B1 | 5/2015 | Jai et al. | |
| 9,250,937 | B1* | 2/2016 | Franz | G06F 21/54 |
| 9,569,184 | B2* | 2/2017 | Tejani | G06F 8/51 |
| 10,929,160 | B1* | 2/2021 | Mateev | G06F 9/4552 |
| 2003/0070161 | A1 | 4/2003 | Wong et al. | |
| 2009/0019431 | A1 | 1/2009 | George et al. | |
| 2014/0082597 | A1 | 3/2014 | Chafi et al. | |
| 2016/0041816 | A1 | 2/2016 | Yang et al. | |
| 2017/0269950 | A1 | 9/2017 | Lu et al. | |

OTHER PUBLICATIONS

Hong et al, "Java Client Ahead-of-Time Compiler for Embedded Systems", ACM, pp. 63-72 (Year: 2007).*

Wang et al, "A Method-Based Ahead-of-Time Compiler for Android Applications", ACM, pp. 15-24 (Year: 2011).*

Jung et al., "Supporting Precise Garbage Collection in Java Bytecode to- C Ahead-of-Time Compiler for Embedded Systems", ACM, pp. 35-42 (Year: 2006).*

Reijers et al, "Improved Ahead-of-time Compilation of Stack-based JVM Bytecode on Resource-constrained Devices", ACM, pp. 1-44 (Year: 2019).*

Park et al, "Reusing the Optimized Code for JavaScript Ahead-of-Time Compilation", ACM, pp. 1-20 (Year: 2018).*

Nilsson et al, "On Real-Time Performance of Ahead-of-Time Compiled Java", IEEE, pp. 1-10 (Year: 2005).*

Bernat et al., "Portable Worst-Case Execution Time Analysis Using Java Byte Code", IEEE, pp. 1-8 (Year: 2000).*

Communication dated May 13, 2020, from the European Patent Office in counterpart European Application No. 19209504.0.

International Search Report (PCT/ISA/210), issued by International Searching Authority in corresponding International Application No. PCT/KR2019/015201, dated Mar. 9, 2020.

Toshio Suganuma et al. "A Region-Based Compilation Technique for a Java Just-In-Time Compiler" Proceedings of the 2009 ACM Sigplan Conference of Programming Language Design and Implementation, Jun. 1, 2003, (pp. 312-323) XP001159681.

* cited by examiner

FIG. 5

| Machine code | APP | Assembly | State |
|---|---|---|---|
| Machine code #1 | APP #1 | Assembly #1 | Save |
| Machine code #2 | APP #1 | Assembly #2 | Delete |
| Machine code #3 | APP #2 | Assembly #3 | Save |
| Machine code #4 | APP #2 | Assembly #4 | Save |

USER EQUIPMENT, SERVER, CONTROL METHOD OF THE USER EQUIPMENT AND CONTROL METHOD OF THE SERVER FOR PERFORMING AHEAD-OF-TIME (AOT) COMPILATION OF AN APPLICATION BASED ON USAGE FREQUENCY

CROSS-REFERENCE TO RELATED APPLICATION(S)

This application is based on and claims priority under 35 U.S.C. § 119 to Korean Patent Application No. 10-2018-0141513 filed on Nov. 16, 2018 in the Korean Intellectual Property Office, the disclosure of which is incorporated herein by reference in its entirety.

BACKGROUND

1. Field

The disclosure relates to a user equipment (UE) and a server, which perform ahead-of-time (AOT) compilation of source code of an application.

2. Description of Related Art

In general, a UE compiles source code of an application that has a bytecode format to a machine language such as native code or machine code in order to run the application.

Methods for compiling source code of an application include a just-in-time (JIT) compilation method to perform compilation each time the application runs, and an AOT compilation method to compile source code of an application before execution of the application.

In contrast to the JIT compilation method, the AOT compilation method may provide previously compiled machine code, and thereby may allow the application to run more quickly without recompilation of the application.

The AOT compilation method, however, may have a long compilation time due to hardware limitations of the UE and consume memory resources of the UE due to the volume of the obtained machine code.

SUMMARY

Provided is a user equipment and control method thereof, which performs ahead-of-time (AOT) compilation of a file frequently used by the user based on the user's history of running applications, and a server and control method thereof, which performs AOT compilation on a frequently used application based on histories of running applications in a plurality of user equipments, and sends the compilation results to the user equipment.

In accordance with an aspect of the disclosure, there is provided a user equipment (UE) including a storage, and a controller that may identify a first assembly file, among a plurality of assembly files of a first application, having a first usage frequency that is equal to or greater than a predetermined threshold, ahead-of-time (AOT) compile the first assembly file based on the first assembly file having the first usage frequency that is equal to or greater than the predetermined threshold, obtain a first compilation result based on AOT compiling the first assembly file, store the first compilation result in the storage, and execute the first application by using the first compilation result stored in the storage based on a request to execute the first application.

The controller may, based on receiving a user request to execute a particular function among a plurality of functions of the first application while executing the first application, identify whether a second compilation result of a second assembly file corresponding to the particular function is stored in the storage.

The controller may execute the first application using the second compilation result of the second assembly file corresponding to the particular function based on identifying that the second compilation result is stored in the storage.

The controller may just-in-time (JIT) compile the second assembly file corresponding to the particular function based on identifying that the second compilation result of the second assembly file is not stored in the storage, and execute the first application based on JIT compiling the second assembly file corresponding to the particular function.

The first application may have a bytecode format.

The controller may execute a virtual machine (VM) based on the first application having a bytecode format, and AOT compile the first assembly file using the VM.

The controller may, based on receiving a user request to execute a function of the first application that does not correspond to a second compilation result stored in the storage while executing the first application, just-in-time (JIT) compile a second assembly file that corresponds to the function using the VM that executes the first application.

The controller may identify a second assembly file, among the plurality of assembly files of the first application, having a second usage frequency that is less than the predetermined threshold, and remove a second compilation result corresponding to the second assembly file from the storage.

The UE may further include a communication device configured to communicate with a server, and the controller may control the communication device to transmit application execution history information including at least one of an application identifier, assembly file information identifying an assembly file used by the UE, or device version information of the UE to the server, based on executing the first application.

The device version information may include at least one of a firmware version, a middleware version, or an application programming interface (API) version of the UE.

The controller may control the communication device to transmit an application download request message for a second application to the server, and receive information associated with compilation of the second application that is compatible with a device version of the UE based on the application download request message.

The controller may identify a second assembly file, a plurality of assembly files of the second application, based on the information associated with compilation of the second application, and AOT compile the second assembly file.

In accordance with an aspect of the disclosure, there is provided a server including a storage, a communication device configured to communicate with a plurality of user equipments (UEs) via a network, and a controller that may receive application execution history information from the plurality of UEs, identify an application having a usage frequency that is equal to or greater than a predetermined threshold based on the application execution history information, ahead-of-time (AOT) compile source code of the application into a compilation result based on the usage frequency being equal to or greater than the predetermined threshold, obtain a compilation result based of AOT compiling the source code of the application, and store the compilation result in the storage.

The may include at least one of an application identifier of the application, assembly file information associated with an assembly file of the application, or device version information of a UE that is configured to execute the application.

The device version information may include at least one of a firmware version, a middleware version, or an application programming interface (API) version of the UE that is configured to execute the application.

The controller may identify an assembly file, among a plurality of assembly files of the application, having another usage frequency equal to or greater than another predetermined threshold based on the assembly file information, and AOT compile the assembly file.

The controller may compare usage frequencies of a plurality of applications corresponding to a same application identifier and a same device version with the predetermined threshold, and identify the application based on comparing the usage frequencies.

The controller may generate a virtual machine (VM) having the same device version corresponding to the application based on device version information corresponding to the application.

The controller may obtain the compilation result that is compatible with the same device version by using the VM.

The controller may receive, via the communication device, an application download request message for the application from at least one UE, and control the communication device to transmit the compilation result that is compatible with the device version of the at least one UE and corresponding to the application to the at least one UE.

In accordance with an aspect of the disclosure, there is provided is a control method of a user equipment (UE) including a storage and a communication device configured to communicate with a server, the control method includes identifying a first assembly file, among a plurality of assembly files of a first application, having a usage frequency that is equal to greater than a predetermined threshold, ahead-of-time (AOT) compiling the first assembly file based on the usage frequency being equal to or greater than the predetermined threshold, obtaining a compilation result based on AOT compiling the first assembly file, storing the compilation result in the storage, and executing the first application by using the compilation result stored in the storage based on a request to execute the first application.

The control method may further include based on receiving a user request to execute a particular function among a plurality of functions of the first application while executing the first application, identifying whether a second compilation result of a second assembly file corresponding to the particular function is stored in the storage.

The control method may include executing the first application using the second compilation result of the second assembly file corresponding to the particular function based on identifying that the second compilation result being stored in the storage.

The control method may include just-in-time (JIT) compiling the second assembly file based on identifying that the second compilation result is not stored in the storage, and executing the first application based on JIT compiling the second assembly file.

The first application may have a bytecode format.

The control method may further include generating a virtual machine (VM) configured to perform the AOT compilation based on the first application having a bytecode format.

The control method may further include performing JIT compilation by using the VM that executes the first application, based on receiving a user request to execute a function that does not correspond to a compilation result stored in the storage while executing the first application.

The control method may further include determining an assembly file having a compilation result stored in the storage that is to be deleted based on the usage frequency of the assembly file, among the plurality of assembly files of the first application.

The control method may further include controlling the communication device to transmit application execution history information including at least one of an application identifier, assembly file information identifying an assembly file, or device version information of the UE to the server, based on executing the first application.

The device version information may include at least one of a firmware version, a middleware version, or an application programming interface (API) version of the UE.

The control method may further include controlling the communication device to transmit an application download request message for a second application to the server and receiving, via the communication device, information associated with compilation compatible with a device version of the UE and corresponding to the second application.

The control method may further include identifying an assembly file to be AOT compiled among a plurality of assembly files of the second application based on the information associated with compilation corresponding to the second application.

BRIEF DESCRIPTION OF THE DRAWINGS

The above and other objects, features, and advantages of the present disclosure will be more apparent from the following description taken in conjunction with the accompanying drawings, in which:

FIG. 5 is a diagram of compilation results stored in a UE, according to an embodiment;

DETAILED DESCRIPTION

Figure 1:
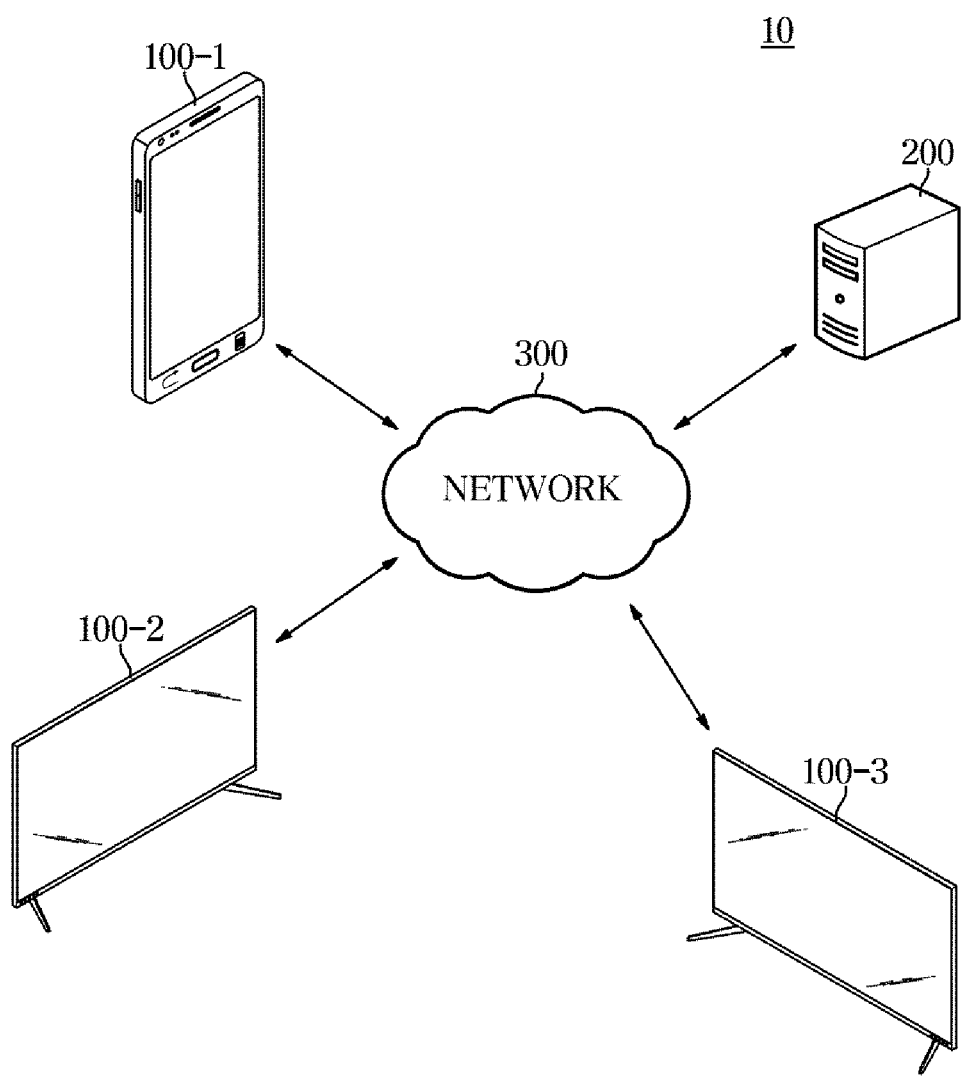
FIG. 1 is a diagram of an application execution system including user equipments (UEs) and a server, according to an embodiment.

Embodiments and features as described and illustrated in the disclosure are provided as examples, and it should be understood that various modifications may be possible.

It should be further understood that the term "connect" or its derivatives may refer both to direct and indirect connection, and that indirect connection includes a connection via a wireless communication network.

The terminology used herein may describe particular embodiments and is not intended to limit the disclosure. It should also be understood that the singular forms "a," "an," and "the" may also include the plural forms unless the context clearly dictates otherwise. It should be further understood that the terms "comprise" and/or "comprising," as used herein, may specify the presence of stated features, integers, steps, operations, elements, and/or components, but might not preclude the presence or addition of one or more other features, integers, steps, operations, elements, components, and/or combinations thereof.

Terms including ordinal numbers such as "first" and "second" may be used to explain various components, but the components are not limited by the terms. The terms may be used for the purpose of distinguishing a component from another. Thus, a first element, component, region, layer or section discussed below may also be referred to as a second element, component, region, layer or section without departing from the teachings of the disclosure.

Furthermore, the terms, such as "~ part," "~ block," "~ member," "~ module," etc., may refer to a unit configured to perform at least one function or operation. For example, the terms may refer to at least one unit implemented at least partially in hardware such as field-programmable gate array (FPGA), application specific integrated circuit (ASIC), etc., software stored in a memory, or at least one processor.

Reference numerals used for method steps may be used to identify the respective steps, but do not limit an order of the steps. Thus, unless the context clearly dictates otherwise, the written order may also be practiced otherwise.

Reference will now be made in detail to various embodiments, which are illustrated in the accompanying drawings, wherein like reference numerals refer to the like elements throughout.

FIG. 1 is a diagram of an application execution system 10 including user equipment (UE) 100 and a server 200, according to an embodiment.

Referring to FIG. 1, the application execution system 10 may include a plurality of UEs 100-1, 100-2, and 100-3, the server 200, and a network 300.

Each of the UEs 100 may be connected to the server 200 via the network 300. For example, the UE 100 may be connected to the network 300 via wireless connection or wired connection to communicate with the server 200 via wireless communication or wired communication.

The wireless communication may include cellular communication using at least one of Long-Term Evolution (LTE), LTE-Advanced (LTE-A), Code Divisional Multiplexing Access (CDMA), Wideband CDMA (WCDMA), Universal Mobile Telecommunications System (UMTS), Wireless Broadband (WiBro), Global System for Mobile Communications (GSM), etc. In an embodiment, the wireless communication may include at least one of wireless fidelity (Wi-Fi), Bluetooth, Bluetooth low energy (BLE), Zigbee, near field communication (NFC), magnetic secure transmission, radio frequency (RF), a body area network (BAN) communication, and the like. In an embodiment, the wireless communication may include a Global Navigation Satellite System (GNSS) communication. The GNSS may include a Global Positioning System (GPS), a Global Navigation Satellite System (Glonass), a Beidou Navigation Satellite System (hereinafter, also called "Beidou") or Galileo, the European global satellite-based navigation system, and the like.

The wired communication may include at least one of Universal Serial Bus (USB), High Definition Multimedia Interface (HDMI), Recommended Standard (RS) 232, power line communication, Plain Old Telephone Service (POTS), and the like.

The network 300 may include at least one of a telecommunication network, a computer network (e.g., a Local Area Network (LAN), a Wide Area Network (WAN), and the like), the Internet, a telephone network, and the like.

In an embodiment, the UE 100 may include a portable terminal or a stationary terminal.

The portable terminal shown as the UE 100-1 may be a mobile electronic device that is easy to carry, and may include a video phone, a cellular phone, a smart phone, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an E-Book, a portable computer (e.g., a laptop, a tablet, etc.), smart glasses, a digital camera, and the like.

The stationary terminal shown as the UE 100-2 or 100-3 may be an electronic device relatively fixed at a particular location, such as a desktop personal computer, a smart television, etc.

The UE 100 may run an application requested by the user based on the user's input. The UE 100 may transmit a download request message to request downloading of an application to the server 200, receive a compilation result, such as machine code, etc., corresponding to the application, and run the application.

Although three UEs 100-1, 100-2, and 100-3 are shown in FIG. 1, other embodiments include a different number of UEs 100 connected to the server 200 via the network 300.

In an embodiment, the server 200 may be connected to the plurality of UEs 100 via the network 300. For example, the server 200 may be connected to the network 300 via wireless connection or wired connection to communicate with the UEs 100.

The server 200 may receive application execution history information from each of the plurality of UEs 100, identify an application that is frequently used by the user based on a plurality of pieces of the received application execution history information, and perform AOT compilation of the identified application to obtain a compilation result, such as machine code.

The server 200 may transmit the compilation result corresponding to the identified application to the UE 100 based on receiving a download request message for the identified application from the UE 100. Accordingly, the UE 100 may run the application more quickly because the application may run without requiring the UE 100 to perform the compilation. Operation of the server 200 will be described elsewhere herein in more detail.

As described above, the AOT compilation may refer to translating source code of an application into a machine language, such as machine code before execution of the application. The AOT compilation may include loading source code of the application, parsing the source code of the application to create an Abstract Syntax Tree (AST), and converting the source code of the application to the machine code by using the AST. The compilation method is not, however, limited thereto, and may include any method that converts the source code of an application to the machine code.

Furthermore, the AOT compilation is a prior compilation method, by which source code of an application is compiled to a machine language such as machine code before execution of the application, allowing the application to run with the AOT-compiled machine code without compilation based on a command to run the application being received from the user.

"Preloading" may refer to an operation of loading data in a random access memory (RAM) from a hard disk in advance, based on a certain condition being met. The preloading may include an operation for the UE 100 to automatically download data for content from an external device, such as the server 200. In other words, the preloading may refer to loading data into a RAM in advance, and may occupy a memory and a central processing unit (CPU), which might be different from the AOT compilation that stores compiled machine code.

Figure 2:
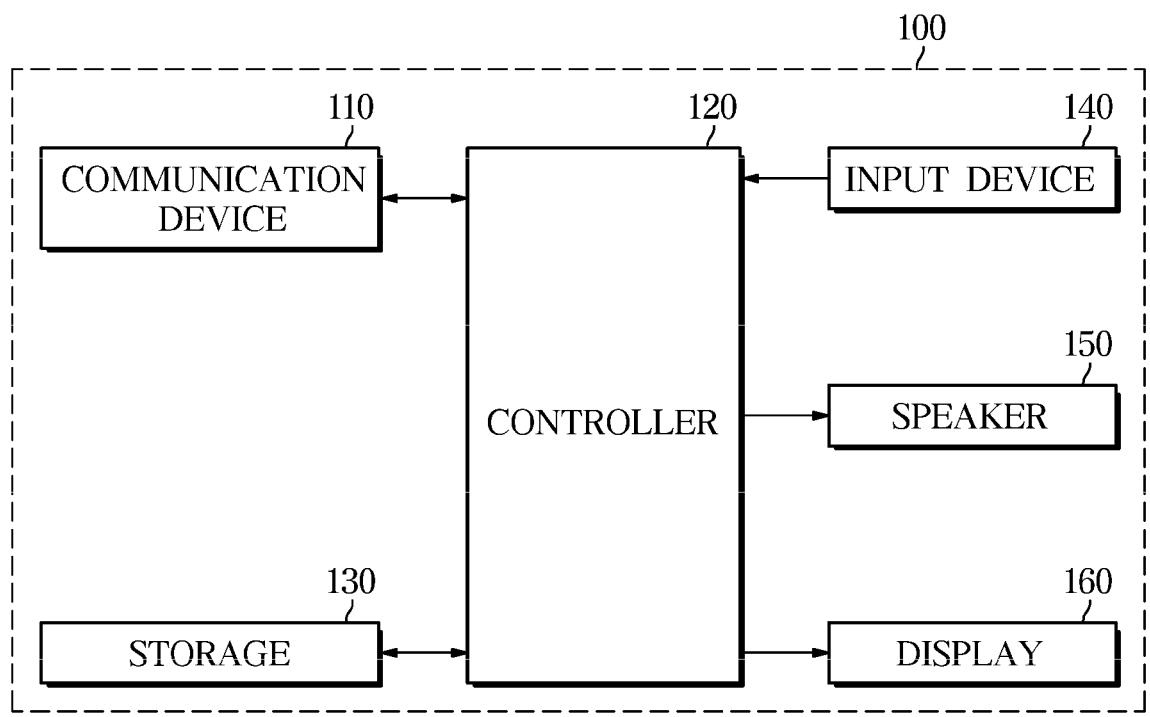
FIG. 2 is a control block diagram of a UE, according to an embodiment.

FIG. 2 is a control block diagram of the UE 100, according to an embodiment.

Referring to FIG. 2, the UE 100 may include a communication device 110 configured to perform communication with the server 200, a controller 120 configured to execute an application and AOT compile an assembly file based on assembly file information identifying the assembly file used to execute the application, a storage 130 configured to store a compilation result, such as machine code, an input device 140 configured to receive an input from the user, a speaker 150 configured to output audible content based on execution of an application, and a display 160 configured to output visual content based on execution of an application.

In an embodiment, the communication device 110 may perform wireless communication or wired communication with the server 200 via the network 300.

The communication device 110 may communicate with the server 200 under the control of the controller 120. Specifically, the communication device 110 may transmit application execution history information or an application download request message to the server 200 under the control of the controller 120, and receive a compilation result such as machine code corresponding to an application from the server 200, as described in more detail elsewhere herein.

The communication device 110 may include a cellular module, a Wi-Fi module, a Bluetooth module, a GNSS module, an NFC module, an RF module, and the like.

In an embodiment, the cellular module, the Wi-Fi module, the Bluetooth module, the GNSS module, and/or the NFC module may be integrated in a single Integrated Circuit (IC) an IC package, and the like. The RF module may transmit and/or receive communication signals, such as RF signals. The RF module may include a transceiver, a power amp module (PAM), a frequency filter, a Low Noise Amplifier (LNA), an antenna, and the like. In an embodiment, the cellular module, the Wi-Fi module, the Bluetooth module, the GNSS module, and/or the NFC module may transmit and/or receive RF signals via a separate RF module.

Furthermore, in an embodiment, the communication device 110 may include a USB module, an HDMI module, an RS-232 module, a POTS module, and the like, configured to perform wired communication.

In an embodiment, the controller 120 may include a CPU, an Application Processor (AP), a Communication Processor (CP), and the like. The controller 120 may perform operations or data processing related to control and/or communication of at least one of the other components of the UE 100.

The controller 120 may control hardware and software components connected to the controller 120 by running an operating system (OS) or application programs, and perform data processing and operations. The controller 120 may be implemented in a System on Chip (SoC).

In an embodiment, the controller 120 may further include a Graphic Processing Unit (GPU) and/or an image signal processor. The controller 120 may load a command or data received from at least one of the other components in volatile memory and then process the command or data, and store the resultant data in non-volatile memory.

In an embodiment, the controller 120 may identify one of a plurality of assembly files included in the source code of an application, whose usage frequency is equal to or greater than a predetermined threshold, obtain a compilation result by AOT compiling the assembly file if there is no compilation result stored in the storage 130 corresponding to the assembly file, and store the compilation result in the storage 130.

Specifically, the controller 120 may identify an assembly file to be AOT compiled based on information associated with the usage frequency among a plurality of assembly files included in source code of an application, obtain a compilation result by AOT compiling the identified assembly file, store the compilation result in the storage 130, and run the application using the compilation result stored in the storage 130 in response to a request to run the application.

In this case, if the compilation result corresponding to a function of the application is present in the storage 130, then the controller 120 may use the compilation result to run the application. Alternatively, if the compilation result corresponding to the function of the application is not present in the storage 130, then the controller 120 may run the application by compiling an assembly file corresponding to the function of the application among the plurality of assembly files.

Specifically, based on a request to execute a particular function among a plurality of functions supported by an application from the user after the application runs, the controller 120 may identify whether a compilation result of an assembly file corresponding to the particular function is stored in the storage 130.

If the compilation result of the assembly file corresponding to the particular function is stored in the storage 130, then the controller 120 may run the application using the compilation result.

If the compilation result of the assembly file corresponding to the particular function is not stored in the storage 130, then the controller 120 may run the application by JIT compiling the assembly file corresponding to the particular function.

An application that is a target of AOT compilation may correspond to a bytecode format application. Specifically, an application to be AOT compiled may be of a bytecode format that may be executed by being compiled in a virtual machine (VM).

Accordingly, the controller 120 may run a VM that performs AOT compilation on a bytecode format type application.

Furthermore, based on a request to execute a function that does not correspond to a compilation result stored in the storage 130 after the bytecode format application runs, the controller 120 may perform JIT compilation using a VM that runs the application.

Source code of an application may include a plurality of assembly files to provide various functions. For example, the source code of an application may include a plurality of assembly files, such as an assembly file to provide a particular function and another assembly file to provide another function.

As described above, the UE 100 may identify an assembly file in the source code of an application, which corresponds to a frequently used function, perform AOT compilation, which is a prior compilation method, on the frequently used assembly file, and store the compilation result to be used when the function of the application is re-executed. Compilation of an assembly file based on the usage frequency will be described in more detail elsewhere herein.

The controller 120 may identify an assembly file having a usage frequency that is less than a predetermined threshold, and delete the compilation result of the assembly file from the storage 130 based on the compilation result being stored in the storage 130.

In other words, the controller 120 may identify any one of a plurality of assembly files included in the source code of an application, whose compilation result stored in the storage 130 is to be deleted, based on the usage frequencies of the assembly files.

As described above, by updating compilation results, such as machine code stored in the storage 130 by taking into account the usage frequency of the application or assembly file by the user, the UE 100 may delete a compilation result of an application or assembly file that has been used less frequently than as compared to other applications or assembly files. In this way, the UE 100 may use the storage space more adaptively and efficiently, thereby conserving memory resources.

In an embodiment, the controller 120 may control the communication device 110 to transmit application execution history information including at least one of an application identifier, assembly file information identifying an assembly file being used, or device version information of the UE 100 to the server 200.

The device version information may include information that identifies a firmware version, a middleware version, an application programming interface (API) version, an OS version, a device version, a hardware version, and the like, of the UE 100.

The server 200 may obtain the application execution history information from the plurality of UEs 100, identify a frequently used application based on the received application execution history information, and perform AOT compilation of the identified application. The AOT compilation of the server 200 will be described elsewhere herein in more detail.

In an embodiment, the controller 120 may control the communication device 110 to transmit a download request message for an application to the server 200. The download request message may include the device version information of the UE 100.

Furthermore, t the communication device 110 may receive a compilation result corresponding to an application that is compatible with the device version of the UE 100 from the server 200. Receiving the compilation result from the server 200 will be described elsewhere herein in more detail.

As described above, the controller 120 of the UE 100 may include at least one memory for storing a program for carrying out the aforementioned and following operations, and at least one processor for executing the program. The memory and processor may be integrated in a single chip or physically distributed.

The storage 130 may include volatile and/or non-volatile memories. For example, the storage 130 may store commands or data associated with at least one of the other components of the UE 100.

The storage 130 may include an internal memory or an external memory. The internal memory may include at least one of a volatile memory, such as dynamic RAM (DRAM), static RAM (SRAM), synchronous DRAM (SDRAM), or the like, or a non-volatile memory, such as a one time programmable ROM (OTPROM), a programmable ROM (PROM), an erasable PROM (EPROM), an electrically erasable PROM (EEPROM), a mask ROM, a flash ROM, a flash memory, a hard drive, a solid state drive (SSD), and the like.

The external memory may include a flash drive, such as compact flash (CF), secure digital (SD), micro-SD, mini-SD, extreme digital (xD), multimedia card (MMC), a memory stick, or the like. The external memory may be functionally and/or physically connected to the UE 100 via various interfaces.

In an embodiment, the storage 130 may store software and/or a program. The program may include, for example, firmware, a kernel, middleware, an API, and/or application programs (or applications).

The firmware may refer to programs used to control hardware components of the UE 100 while the UE 100 is activated. The firmware may be enhanced to provide improved performance and debugging, and may be updated with new versions.

The kernel may control or manage system resources such as a processor, a memory, or the like, to be used to carry out an operation or function implemented in other programs, such as the firmware, the middleware, the API, or the application. Furthermore, the kernel may provide an interface for the firmware, the middleware, the API, or the application to access respective components of the UE 100 to control or manage system resources.

The middleware may perform a role of an intermediary for allowing the API or application to communicate with the kernel to exchange data. Furthermore, the middleware may handle one or more task requests received from the application in priority order. For example, the middleware may allocate priority to at least one of the applications for using the system resources, such as the processor or the memory, of the UE 100, and handle the one or more task requests.

The API may refer to an interface for the application to control a function provided from the firmware, the kernel, or the middleware, and may include at least one interface or function (e.g., an instruction) for file control, window control, image processing, text control, etc.

Furthermore, the storage 130 may store an OS for controlling resources related to the UE 100 and/or various applications or application programs driven in the OS. The OS may include, for example, Android™, iOS™, Windows™, Symbian™, Tizen™, or Bada™.

At least a portion of the storage 130 may be preloaded onto the UE 100, or may be downloaded from an external electronic device, such as the server 200.

Furthermore, version information identifying a version of each of the firmware, the middleware, the API, and the application stored in the storage 130 may be stored. In other words, the storage 130 may store version information of the UE 100 including information that identifies a firmware version, a kernel version, a middleware version, an API version, or an application version.

In an embodiment, the storage 130 may store a compilation result of an application. Specifically, the storage 130 may store a compilation result, such as machine code of an AOT compiled application based on an operation of the controller 120. The storage 130 may store a compilation result of each of the plurality of applications stored in the UE 100, and may also store the compilation result of each assembly file in the source code of each application. Compilation results stored in the storage 130 will be described elsewhere herein in more detail.

In an embodiment, the input device 140 may send commands or data input from the user or an external device to other component(s) of the UE 100.

The input device 140 may include a touch panel, a (digital) pen sensor, a key, a wireless input device, an ultrasonic input device, and the like. The touch panel may employ at least one of a capacitive, a resistive, an infrared, or ultrasonic method. The touch panel may further include a control circuit. The touch panel may further include a tactile layer for providing the user with haptic sensation. The (digital) pen sensor may be a part of the touch panel 252, or include a separate sheet for recognition. The key may include a physical button, an optical key, or a key pad. The wireless input device may receive a command input from the user based on an input signal from an electronic device, such as a remote control, attached to but separate from the UE 100. The wireless input device may include a separate communication module configured to receive the signal from the electronic device. The ultrasonic input device may detect ultrasound originated from an input tool via a microphone to identify data corresponding to the detected ultrasound.

In an embodiment, the input device 140 may receive a command to execute a particular function of a certain application from the user of the UE 100, and a command to download the certain application. The command received from the user is not limited thereto, and there may be various commands depending on functions to be performed in the UE 100.

The speaker 150 may convert between sound and electric signals. The speaker 150 may process sound information input or output via a receiver, an earphone, a microphone, etc.

In an embodiment, the speaker 150 may provide the user with audible content output based on an application being executed.

The display 160 may include a Liquid Crystal Display (LCD), a Light Emitting Diode (LED) display, an organic LED (OLED) display, a Micro-Electromechanical System (MEMS) display, an electronic paper display, and the like. The display 160 may display various contents, such as text, images, video, icons, symbols, etc., for the user.

In other words, the display 160 may provide the user with visual content output based on an application being executed.

The display 160 may include a touch screen, which may detect touches, gestures, proximity, or hovering inputs of an electronic pen or a body part of the user.

Figure 3:
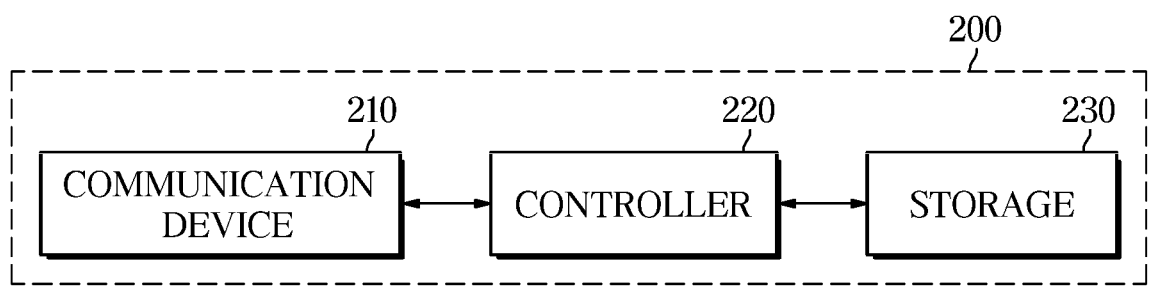
FIG. 3 is a control block diagram of a server, according to an embodiment.

FIG. 3 is a control block diagram of the server 200, according to an embodiment.

Referring to FIG. 3, the server 200 may include a communication device 210 configured to perform communication with the plurality of UEs 100 via the network 300, a controller 220 configured to identify an application having a usage frequency that is equal to or greater than a predetermined threshold based on information associated with an application execution history received from each of the plurality of UEs 100, and obtain a compilation result by AOT compiling the determined application, and a storage 230 configured to store the compilation result.

In an embodiment, the communication device 210 may perform wireless communication or wired communication with the UEs 100 via the network 300.

For example, the communication device 210 may communicate with the UEs 100 under the control of the controller 220. Specifically, the communication device 210 may receive application execution history information or an application download request message from the plurality of UEs 100, and transmit a compilation result such as machine code corresponding to the application to the UE 100 that sent the application download request message, as described in more detail elsewhere herein.

The communication device 210 may include a cellular module, a Wi-Fi module, a Bluetooth module, a GNSS module, an NFC module, an RF module, and the like.

In an embodiment, the cellular module, the Wi-Fi module, the Bluetooth module, the GNSS module, and/or the NFC module may be integrated in a single Integrated Circuit (IC) an IC package, and the like. The RF module may transmit and/or receive communication signals, such as RF signals. The RF module may include a transceiver, a PAM, a frequency filter, an LNA, an antenna, and the like. In an embodiment, the cellular module, the Wi-Fi module, the Bluetooth module, the GNSS module, and/or the NFC module may transmit and/or receive RF signals via a separate RF module.

Furthermore, in an embodiment, the communication device 210 may include a USB module, an HDMI module, an RS-232 module, a POTS module, and the like, for wired communication.

In an embodiment, the controller 220 may include one or more of CPUs, Application Processors (APs), or Communication Processors (CPs). The controller 220 may perform operations or data processing associated with control and/or communication of at least one of the other components of the server 200.

The controller 220 may control hardware and software components connected to the controller 220 by running an OS or application programs, and perform data processing and operations. The controller 220 may be implemented in a System on Chip (SoC).

In an embodiment, the controller 220 may further include a GPU and/or an image signal processor. The controller 220 may load a command or data received from at least one of the other components in volatile memory and then process the command or data, and store the resultant data in non-volatile memory.

In an embodiment, the controller 220 of the server 200 may identify an application having a usage frequency that is equal to or greater than the predetermined threshold based on application execution history information received from each of the plurality of UEs 100, and obtain a compilation result by AOT compiling source code of the identified application based on there a compilation result corresponding to the application not being stored in the storage 230.

The application execution history information may include at least one of an application identifier for an application, assembly file information associated with an assembly file, or device version information of the UE 100 in which the application runs.

Specifically, the controller 220 may identify an assembly file having a usage frequency that is equal to or greater than the predetermined threshold among a plurality of assembly files included in source code of an application identified based on the assembly file information, and obtain a compilation result for the application by AOT compiling the assembly file.

Specifically, the controller 220 may AOT compile an application with a relatively high usage frequency based on application execution history information received from the plurality of UEs 100 to obtain a compilation result, such as machine code of the application.

In addition to obtaining the compilation result, such as machine code of the application by AOT compiling the entire source code of the application, the controller 220 may also obtain a compilation result for the application by AOT compiling an assembly file having a relatively high usage frequency among the source code of the application. The latter compilation result may include machine code corresponding to some of the plurality of assembly files included in the source code of the application.

Furthermore, the controller 220 may identify an application that is a target of AOT compilation by comparing the usage frequencies of each application corresponding to the same application identifier and device version information with the predetermined threshold.

Specifically, the controller 220 may classify a plurality of applications based on application type and device version information of the UE 100 in which the applications run, and compare the usage frequencies of each of the classified applications with the predetermined threshold.

In this way, the controller 220 may identify whether AOT compilation is to be performed for each of applications with the same application type and the same device version information.

In an embodiment, the controller 220 may generate a VM having a device version corresponding to an application identified as a target to be AOT compiled, based on device version information corresponding to the identified application.

Specifically, the controller 220 may identify a device version in which the application identified as a target to be AOT compiled may run, based on the device version information, and generate a VM having the identified device version.

For example, the controller 220 may generate a VM having a firmware version, a middleware version, an API version, and/or a kernel version for the identified application.

The VM may refer to a virtualization of a physical machine in software that provides the same operating environment as the device version, such as the firmware version, the middleware version, the API version, and the kernel version for the identified application.

That is, the VM may refer to a virtual resource that is implemented in software by being assigned a processor, a memory, a disk I/O, etc., and that has the same operating environment as the device version of the UE 100.

The controller 220 may perform AOT compilation in the VM that generates the same result as compilation in the UE 100 having the same device version, and the compilation result generated in the VM may be compatible with the UE 100 having the same device version as the VM.

In other words, the controller 220 of the server 200 may use the VM to generate a compilation result that is compatible with the device version of the UE 100.

In an embodiment, the communication device 210 may receive a download request message for an identified application from at least one of the UEs 100.

Specifically, the communication device 210 may receive a download request message for an application with its compilation result stored in the storage 230 from the at least one UE 100.

The download request message may include the device version information of the UE 100 that sent the message, and an identifier of the application requested.

In an embodiment, the controller 220 may control the communication device 210 to transmit the compilation result that is compatible with the device version of the at least one UE 100 and that corresponds to the identified application to the UE 100.

Accordingly, the UE 100 may not be required to compile the source code of the application, and instead may use the compilation result for the application, thereby allowing the application to run more quickly.

That is, to reduce the need for the UE 100 to perform compilation, the server 200 may perform AOT compilation of the application, thereby allowing the controller 120 and the storage 130 of the UE 100 to be utilized more adaptively and thereby conserving the resources allocated for compilation. Transmitting the compilation result to at least one of the UEs 100 will be described in more detail elsewhere herein.

As described above, the controller 220 of the server 200 may include at least one memory for storing a program for carrying out the aforementioned and following operations, and at least one processor for executing the program. The processor and memory may be integrated in a single chip or physically distributed.

The storage 230 may include volatile and/or non-volatile memories. For example, the storage 230 may store commands or data associated with at least one of the other components of the server 200.

The storage 230 may include an internal memory or an external memory. The internal memory may include at least one of a volatile memory, such as a DRAM, an SRAM, an SDRAM, or the like, or a non-volatile memory, such as an OTPROM, a PROM, an EPROM, an EEPROM, a mask ROM, a flash ROM, a flash memory, a hard drive, or an SSD.

The external memory may include a flash drive, such as CF, SD, micro-SD, mini-SD, xD, a multimedia card (MMC), a memory stick, or the like. The external memory may be functionally and/or physically connected to the server 200 via various interfaces.

Furthermore, the storage 230 may store an OS for controlling resources associated with the server 200 and/or various applications or application programs driven in the OS.

At least a portion of the storage 230 may be preloaded onto the server 200, or may be downloaded from an external electronic device, such as an external server.

In an embodiment, the storage 230 may store a compilation result of an application identified based on the application execution history information received from the plurality of UEs 100. The storage 230 may store a compilation result of each of the plurality of applications, and may also store the compilation result for each assembly file in the source code of each application. Compilation results stored in the storage 230 will be described elsewhere herein in more detail.

Figure 4:
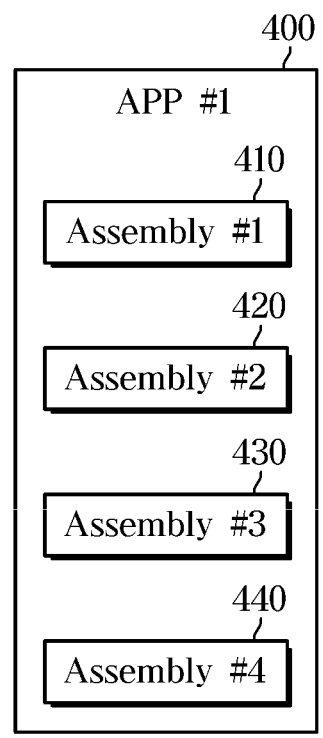
FIG. 4 is a diagram of source code of an application, according to an embodiment.

FIG. 4 is a diagram of source code 400 of an application, according to an embodiment.

Referring to FIG. 4, the source code 400 of an application may include a plurality of assembly files 410 through 440.

Specifically, the source code 400 of each of a plurality of application programs stored in the storage 130 of the UE 100 may include a plurality of assembly files. Although four assembly files 410 through 440 are shown in FIG. 4, other embodiments include a different number of assembly files included in source code of an application.

An application may provide various functions based on a manner in which the application is executed and/or the manner in which the user interacts with the application. For example, an application for content reproduction may reproduce an image based on an input from the user, and may reproduce music based on another input from the user.

In this case, the source code 400 of the application for content reproduction may include assembly files Assembly #1 410, Assembly #2 420, and Assembly #3 430 used for reproducing images.

Each of the assembly files 410, 420, and 430 may include different source code to perform a function associated with reproducing the image. For example, Assembly #1 410 may include source code for reproducing an image, Assembly #2 420 may include source code for reproducing sound, and Assembly #3 430 may include source code for receiving image information and sound information.

Furthermore, the source code 400 of the application for content reproduction may include assembly files Assembly #2 420, Assembly #3 430, and Assembly #4 440 for reproducing music.

Each of the assembly files 420, 430, and 440 may include different source code to perform a function associated with reproducing music. For example, Assembly #2 420 may include source code for reproducing music, Assembly #3 430 may include source code for receiving music information, and Assembly #4 440 may include source code for regulating an equalizer.

As described above, each application stored in the storage 130 of the UE 100 may include a plurality of assembly files that correspond to functions to be used. The assembly files corresponding to the respective functions to be used may be different from one another. However, some assembly files may be commonly used despite the corresponding functions to be used being different.

FIG. 5 is a diagram of compilation results stored in the UE 100, according to an embodiment.

Referring to FIG. 5, the UE 100 may store compilation results in the storage 130, such as machine code corresponding to the application. The compilation results may be received from the server 200, or may be stored by the UE 100 after the UE 100 compiles source code of the application.

The compilation results may be separately provided based on the types of corresponding applications, and may include compilation results of the entire source code of a corresponding application, or may include compilation results for a frequently used assembly file among the source code of the application.

The UE 100 may run the application using the compilation results stored in the storage 130 without compiling the application.

The compilation results stored in the storage 130 may be updated adaptively based on the usage frequency of the application by the user. In this way, the UE 100 may more efficiently and adaptively utilize the memory storage space.

Specifically, the controller 120 may identify one of a plurality of assembly files included in the source code of an application having a usage frequency that is equal to or greater than a predetermined threshold, obtain a compilation result by AOT compiling the assembly file based on a compilation result corresponding to the assembly file not being stored in the storage 130, and store the compilation result in the storage 130.

More specifically, the controller 120 may identify an assembly file to be AOT compiled based on the usage frequencies a plurality of assembly files included in source code of an application, obtain a compilation result by AOT compiling the identified assembly file, store the compilation result in the storage 130, and run the application based on the compilation result stored in the storage 130 in response to a request to run the application.

In this case, if the compilation result corresponding to a function of the application is stored in the storage 130, then the controller 120 may use the compilation result to run the application. Alternatively, if the compilation result corresponding to the function of the application is not stored in the storage 130, then the controller 120 may run the application by compiling an assembly file corresponding to the function of the application among the plurality of assembly files.

The predetermined threshold may correspond to the usage frequency during a certain period identified as being frequently used by the user, and may be set in advance during a design stage or set in advance by the user via the input device 140.

Specifically, the controller 120 may identify the usage frequency of each application based on application execution history information, and also identify the usage frequency of an assembly file based on a function corresponding to the assembly file being performed by the application.

In this case, the controller 120 may classify applications and assembly files by application identifiers and assembly file identifiers, respectively.

Accordingly, the controller 120 may identify an application and assembly file in the source code of the application having usage frequencies that are equal to or greater than the predetermined threshold. In other words, the controller 120 may identify an application and an assembly file of the application having relatively high usage frequencies based on the application execution history.

The controller 120 may obtain a compilation result by AOT compiling the identified assembly file of the application and store the compilation result in the storage 130. However, if the compilation result corresponding to the assembly file of the application is already stored in the storage 130, then the controller 120 may refrain from compiling the assembly file of the application.

As described above, the UE 100 may identify an assembly file in the source code of an application, which corresponds to a frequently used function, perform AOT compilation, which is a prior compilation method, of the frequently used assembly file, and store the compilation result to be used when the function of the application is re-executed.

For example, when the usage frequency of Assembly #1 of an application, APP #1, is equal to or greater than the predetermined threshold, the Assembly #1 of APP #1 may be AOT compiled into a compilation result, such as Machine code #1, which may in turn be stored in the storage 130.

The controller 120 may identify an assembly file having a usage frequency hat is less than the predetermined threshold, and delete the compilation result of the assembly file from the storage 130 based on the compilation result being stored in the storage 130.

In other words, the controller 120 may identify an assembly file having a compilation result stored in the storage 130 that is to be deleted based on the usage frequency of the assembly file, among a plurality of assembly files included in the source code of an application, being less than the threshold.

For example, if the usage frequency of Assembly #2 of APP #1 is less than the predetermined threshold, and Machine code #2, which is a compilation result corresponding to Assembly #2 of APP #1 is stored in the storage 130, then Machine code #2 may be deleted from the storage 130.

As described above, by updating compilation results, such as machine code stored in the storage 130 based on the usage frequency of the application or assembly file by the user, the UE 100 may delete a compilation result of an application or assembly file that has been used less frequently. In this way, the UE 100 may use the storage space more adaptively and efficiently.

Furthermore, the controller 120 may run an application using a compilation result stored in the storage 130 based on a request to run the application.

For example, if a compilation result corresponding to a function of an application is stored in the storage 130, then the controller 120 may use the compilation result to run the application. Alternatively, if the compilation result corresponding to the function of the application is not stored in the storage 130, then the controller 120 may compile the assembly file corresponding to the function of the application among the plurality of assembly files and run the application.

Specifically, based on a request to execute a particular function among a plurality of functions supported by an application from the user after the application runs, the controller 120 may identify whether a compilation result of an assembly file corresponding to the particular function is stored in the storage 130.

If the compilation result of the assembly file corresponding to the particular function is stored in the storage 130, then the controller 120 may run the application using the compilation result.

If the compilation result of the assembly file corresponding to the particular function is not stored in the storage 130, then the controller 120 may run the application by JIT compiling the assembly file corresponding to the particular function.

An application that is a target of AOT compilation may correspond to a bytecode format application. Specifically, an application to be AOT compiled may be of a bytecode format that may be executed by being compiled in a VM.

Accordingly, the controller 120 may run a VM that performs AOT compilation on a bytecode format type application.

Furthermore, based on a request to execute a function that does not correspond to a compilation result stored in the storage 130 after the bytecode format application runs, the controller 120 may perform JIT compilation using a VM that runs the application.

Figure 6:
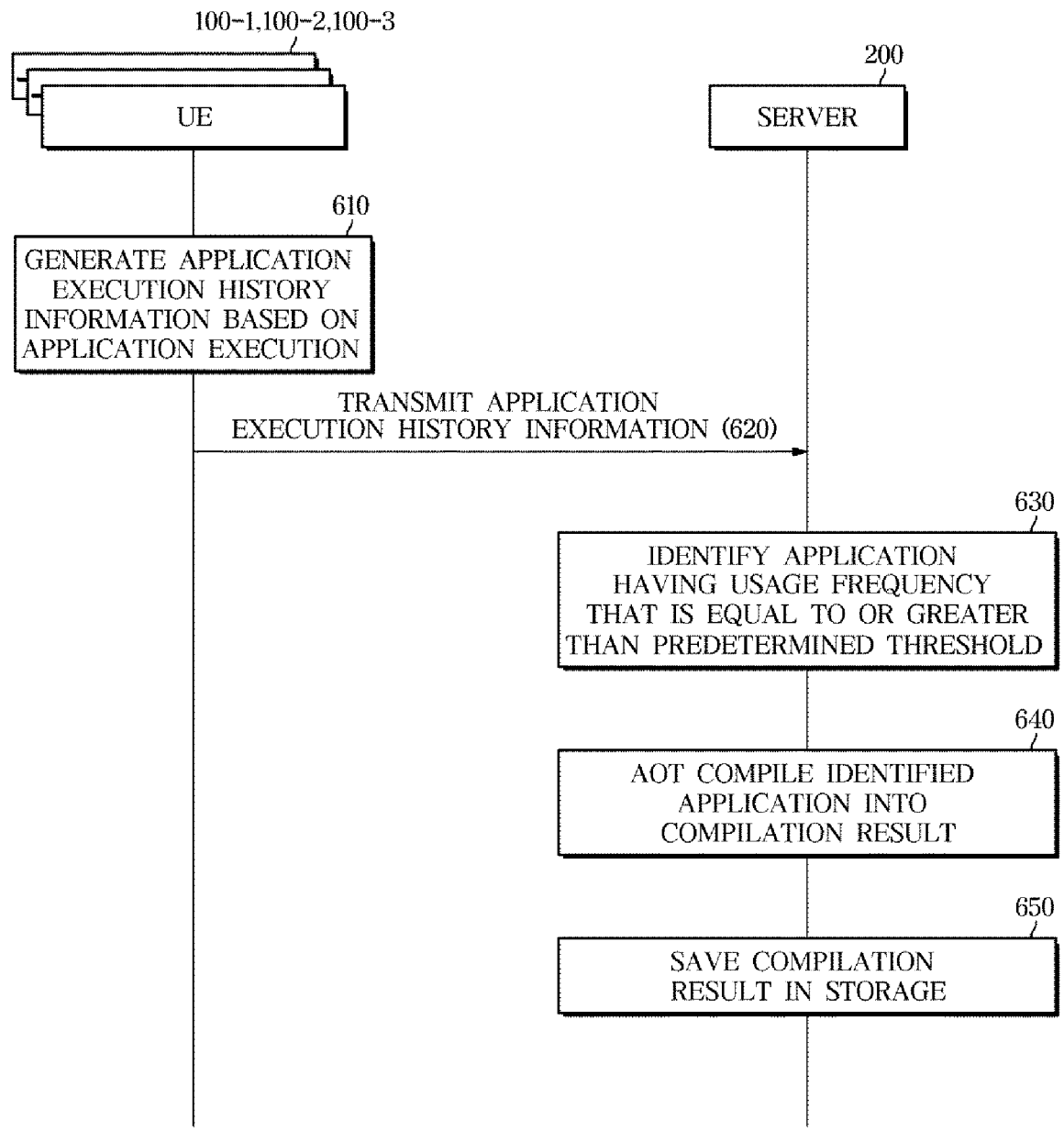
FIG. 6 is a diagram of signal flows of ahead-of-time (AOT) compilation, according to an embodiment.

FIG. 6 is a diagram of signal flows of AOT compilation, according to an embodiment.

Referring to FIG. 6, the plurality of UEs 100-1, 100-2, and 100-3 may generate application execution history information based on application execution, in operation 610.

The application execution history information may include at least one of an application identifier for an application, assembly file information associated with an assembly file that is used, or device version information of the UE 100 in which the application runs.

Specifically, each of the plurality of UEs 100-1, 100-2, and 100-3 may generate application execution history information including at least one of an application identifier for a running application, assembly file information representing an assembly file of the running application, which corresponds to a function being executed, or device version information of the UE 100 that is running the application.

The device version information may include information associated with a firmware version, a middleware version, or an API version of the UE 100.

In an embodiment, the plurality of UEs 100-1, 100-2, and 100-3 may transmit the application execution history information, in operation 620.

Specifically, when one of the plurality of UEs 100-1, 100-2, and 100-3 runs an application, the UE 100 may transmit the application execution history information including at least one of the application identifier, the assembly file information representing an assembly file that is used, or the device version information of the UE 100 in which the application runs, to the server 200.

Accordingly, the server 200 may receive the application execution history information from the plurality of UEs 100-1, 100-2, and 100-3. Specifically, the server 200 may receive information associated with an application that runs in the UE 100, and information associated with an assembly file that is used by the UE from each of the UEs 100-1, 100-2, and 100-3.

In an embodiment, the server 200 may identify an application having a usage frequency that is equal to or greater than the predetermined threshold based on the application execution history information, in operation 630. In other words, the server 200 may identify an application that is frequently used as a target to be AOT compiled, based on the application execution history information.

Furthermore, the controller 220 of the server 200 may identify an application that is a target of AOT compilation by comparing the usage frequencies of each application corresponding to the same application identifier and device version information with the predetermined threshold.

Specifically, the controller 220 may classify a plurality of applications based on application type and device version information of the UE 100 in which the application runs, and compare the usage frequencies of each of the classified applications with the predetermined threshold.

In this way, the controller 220 may identify whether AOT compilation is to be performed for each of the applications with the same application type and the same device version information.

In an embodiment, the server 200 may obtain a compilation result by AOT compiling the identified application, in operation 640.

In an embodiment, the controller 220 of the server 200 may identify an application having a usage frequency that is equal to or greater than the predetermined threshold based on the application execution history information received from each of the plurality of UEs 100, and obtain a compilation result by AOT compiling source code of the identified application based on a compilation result corresponding to the identified application not being stored in the storage 230.

Specifically, the controller 220 may identify an assembly file having a usage frequency that is equal to or greater than the predetermined threshold among a plurality of assembly files included in source code of an application identified based on the application execution history information, and obtain a compilation result for the application by AOT compiling the assembly file.

Specifically, the controller 220 may AOT compile an application having a relatively high usage frequency based on application execution history information received from the plurality of UEs 100 into a compilation result, such as machine code.

In addition to obtaining the compilation result, such as machine code of the application by AOT compiling the entire source code of the application, the controller 220 may also obtain a compilation result for the application by AOT compiling an assembly file having a relatively high usage frequency in the source code of the application. The latter compilation result may include machine code corresponding to some of the plurality of assembly files included in the source code of the application.

In an embodiment, the controller 220 may generate a VM having a device version corresponding to an application identified as a target to be AOT compiled, based on device version information corresponding to the identified application.

Specifically, the controller 220 may identify a device version of the UE 100 in which the application identified as a target to be AOT compiled may run, based on the device version information, and generate a VM having the identified device version.

For example, the controller 220 may generate a VM having a firmware version, a middleware version, an API version, and/or a kernel version for the identified application.

The VM may refers to a virtualization of a physical machine in software that provides the same operating environment as the device version, such as the firmware version, the middleware version, the API version, and the kernel version for the identified application.

That is, the VM may refer to a virtual resource that is implemented in software by being assigned a processor, a memory, a disk I/O, etc., and that has the same operating environment as the device version.

The controller 220 may then perform AOT compilation that generates the same result as compilation in the UE 100 having the device version of the VM, and the compilation result generated in the VM may be compatible with the UE 100 having the same device version as the VM.

In other words, the controller 220 of the server 200 may use the VM to generate a compilation result that is compatible with the device version of the UE 100.

In an embodiment, the server 200 may save the compilation result in the storage 230, in operation 650. The stored compilation result may be transmitted to the UE 100 based on a download request message from the UE 100.

Although three UEs 100-1, 100-2, and 100-3 are shown in FIG. 6, other embodiments include a different number of UEs 100.

Figure 7:
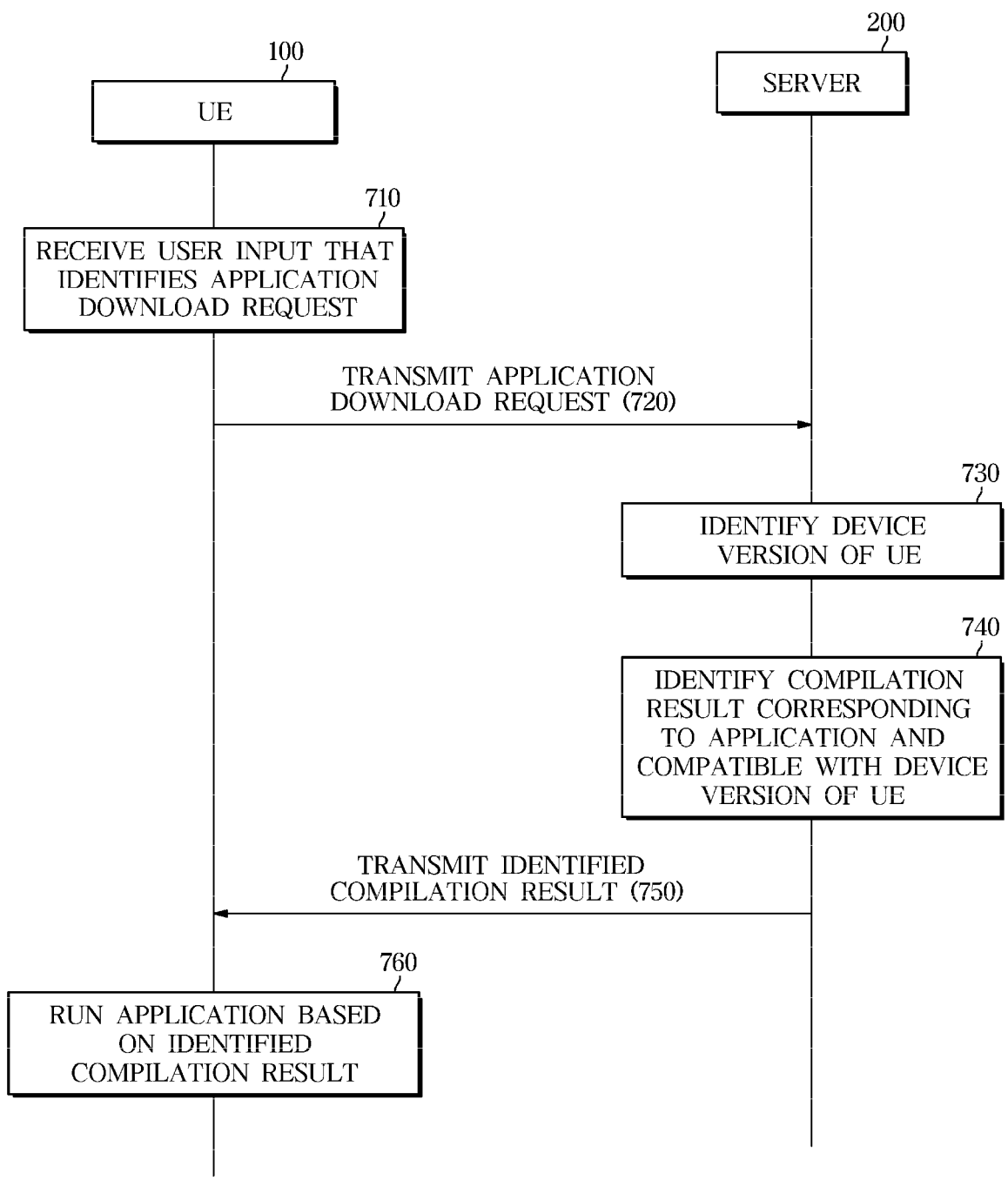
FIG. 7 is a diagram of signal flows of sending a compilation result, according to an embodiment.

FIG. 7 is a diagram of signal flows of sending a compilation result, according to an embodiment.

Referring to FIG. 7, the UE 100 may receive a user input that identifies an application download request, in operation 710.

Specifically, the UE 100 may receive, via the input device 140, a user input that identifies an application download request.

The UE 100 may transmit an application download request to the server 200, in operation 720.

Specifically, in an embodiment, the controller 120 may control the communication device 110 to transmit an application download request message for an application to the server 200. The application download request message may include a UE identifier that identifies the UE 100, device version information of the UE 100, and an application identifier.

In an embodiment, the server 200 may identify the device version of the UE 100, in operation 730. Specifically, the server 200 may identify a device version such as a firmware version, a middleware version, an API version, a kernel version, etc., of the UE 100 that sent the download request message, based on the device version information of the UE 100 included in the application download request message.

In an embodiment, the server 200 may identify a compilation result that is compatible with the device version of the UE 100 and that corresponds to the application, in operation 740.

Specifically, based on the identified device version of the UE 100, the controller 220 of the server 200 may identify a compilation result generated by a VM having a same device version of the UE 100 that sent the application download request message.

The VM having the same device version of the UE 100 may perform AOT compilation of an application that generates the same result as compilation of the application by the UE 100. In this way, the compilation result generated in the VM may be compatible with the UE 100 having the same device version as the VM.

In this case, the controller 220 may identify a compilation result corresponding to an application requested by the UE 100 based on the application identifier included in the application download request message.

In an embodiment, the server 200 may transmit the identified compilation result, in operation 750.

Specifically, the controller 220 of the server 200 may control the communication device 210 to transmit the identified compilation result to the UE 100 that sent the application download request message. The controller 220 may identify the UE 100 that sent the application download request message based on the UE identifier included in the application download request message.

In an embodiment, the UE 100 may run the application based on the identified compilation result, in operation 760.

Specifically, the controller 120 of the UE 100 may run the application based on the compilation result received from the server 200 without compiling the source code of the application on its own. Information resulting from the running function of the application may be output through the speaker 150 or the display 160 of the UE 100.

Accordingly, the UE 100 might not be required to compile the source code of the application, and instead may use the compilation result for the application, thereby allowing the application to run more quickly.

That is, to reduce the need for the UE 100 to perform compilation by itself, the server 200 may perform AOT compilation of the application, thereby allowing the controller 120 and the storage 130 of the UE 100 to be more adaptively and efficiently utilized, and thereby conserving the resources otherwise allocated for compilation.

Furthermore, the controller 120 of the UE 100 may identify an assembly file to be AOT compiled using the compilation result for the application corresponding to the application download request message among the plurality of assembly files of the application. In other words, the compilation result may represent an assembly file to be AOT compiled.

Control methods of the UE 100 and the server 200 in accordance with an embodiment will now be described. The aforementioned UE 100 and the server 200 may be applied in describing the control method of the UE 100 and the control method of the server 200. The above description with regards to FIGS. 1 to 7 may also be applied in the control method of the UE 100 or the server 200, and redundant description may be omitted.

Figure 8:
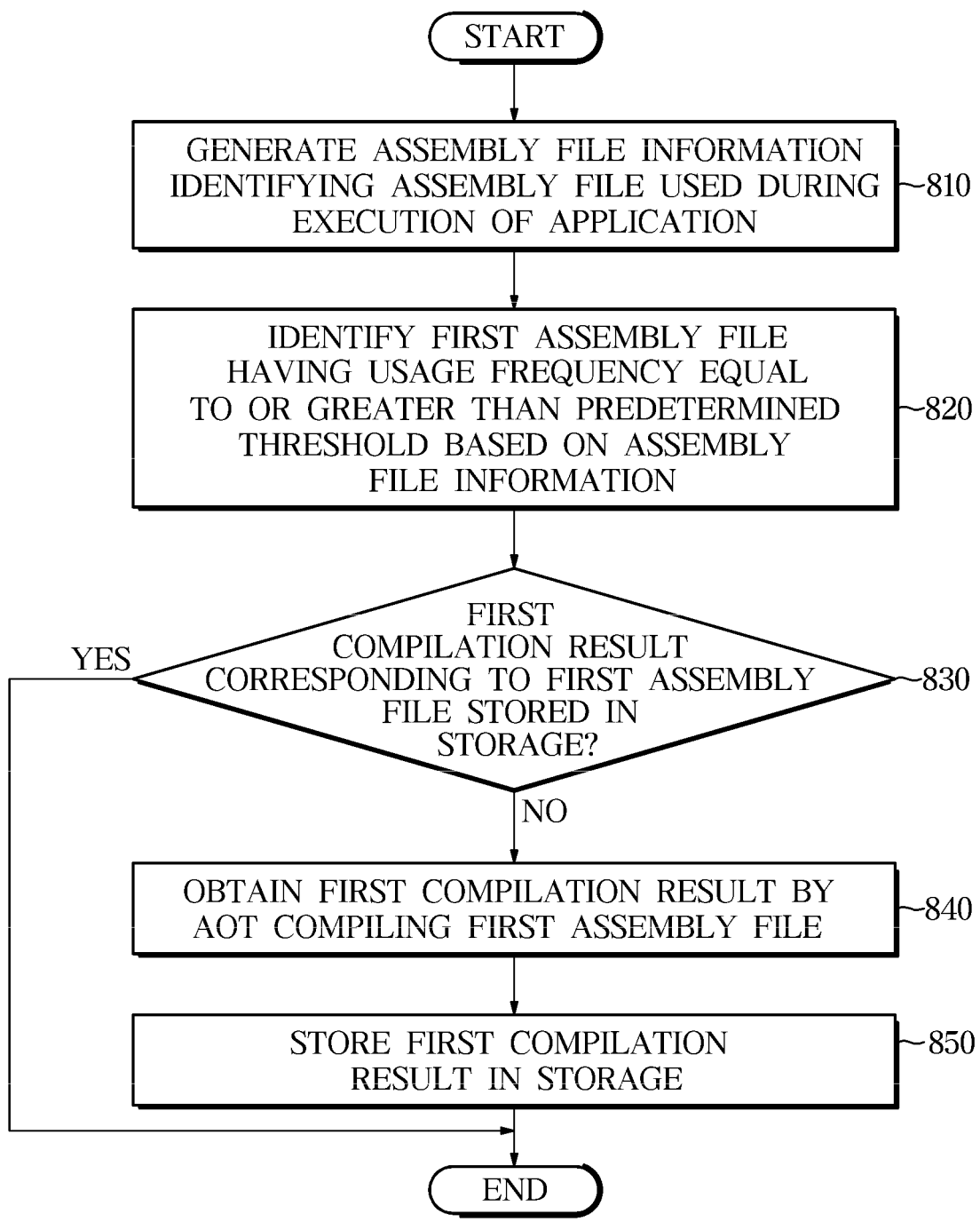
FIG. 8 is a flowchart illustrating a case of updating a compilation result stored in a storage in a control method of a UE, according to an embodiment.

FIG. 8 is a flowchart illustrating a case of updating a compilation result stored in the storage 130 in a control method of the UE 100, according to an embodiment.

Referring to FIG. 8, the controller 120 of the UE 100 may generate assembly file information associated with an assembly file that is used during execution of an application, in operation 810.

The assembly file information may include an application identifier that identifies an application having the assembly file, and may identify the assembly file used during execution the application among a plurality of assembly files included in source code of the application.

In other words, the controller 120 may identify an assembly file associated with a function based on execution of the application, and generate the assembly file information identifying the assembly file. Accordingly, the controller 120 may identify the usage frequency each assembly file included in each application.

In an embodiment, the controller 120 of the UE 100 may identify a first assembly file having a usage frequency that is equal to or greater than a predetermined threshold based on the assembly file information, in operation 820.

Specifically, the controller 120 may identify an assembly file to be AOT compiled based on information associated the usage frequency among a plurality of assembly files included in source code of an application, obtain a compilation result by AOT compiling the identified assembly file, store the compilation result in the storage 130, and run the application using the compilation result stored in the storage 130 in response to a request to run the application.

In this case, if the compilation result corresponding to a function associated with the assembly file of the application is stored in the storage 130, then the controller 120 may use the compilation result to run the application. Alternatively, if the compilation result corresponding to the function associated with the assembly file of the application is not stored in the storage 130, then the controller 120 may run the application by compiling an assembly file corresponding to the function of the application among the plurality of assembly files.

The predetermined threshold may correspond to the usage frequency during a certain period identified as being frequently used by the user, and may be set in advance during a design stage or set in advance by the user via the input device 140.

Specifically, the controller 120 may identify the usage frequency of each application based on application execution history information, and also identify the usage frequency of an assembly file based on a function corresponding to the assembly file being performed by the application.

In this case, the controller 120 may classify applications and assembly files by application identifiers and assembly file identifiers, respectively.

Accordingly, the controller 120 may identify an application having a usage frequency that is equal to or greater than the predetermined threshold, and a first assembly file in the source code of the application. In other words, the controller 120 may identify an application and the first assembly file of the application having a high usage frequency based on the application execution history information.

If the controller identifies that a first compilation result corresponding to the first assembly file is not stored in the storage 130 in operation 830 (operation 830—NO), then the controller 120 of the UE 100 may obtain the first compilation result by AOT compiling the first assembly file in operation 840.

The controller 120 may store the first compilation result in the storage 130, in operation 850.

The controller 120 may obtain a first compilation result by AOT compiling the first assembly file of the application and store the first compilation result in the storage 130. Alternatively, if the controller 120 identifies that the first compilation result is stored in the storage 130 in operation 830 (operation 830—YES), then the controller 120 may refrain from AOT compiling the first assembly file.

As described above, the UE 100 may identify an assembly file in the source code of an application, which corresponds to a frequently used function frequently, perform AOT compilation, which is a prior compilation method, of the frequently used assembly file, and store the compilation result to be used when the function of the application is re-executed.

Figure 9:
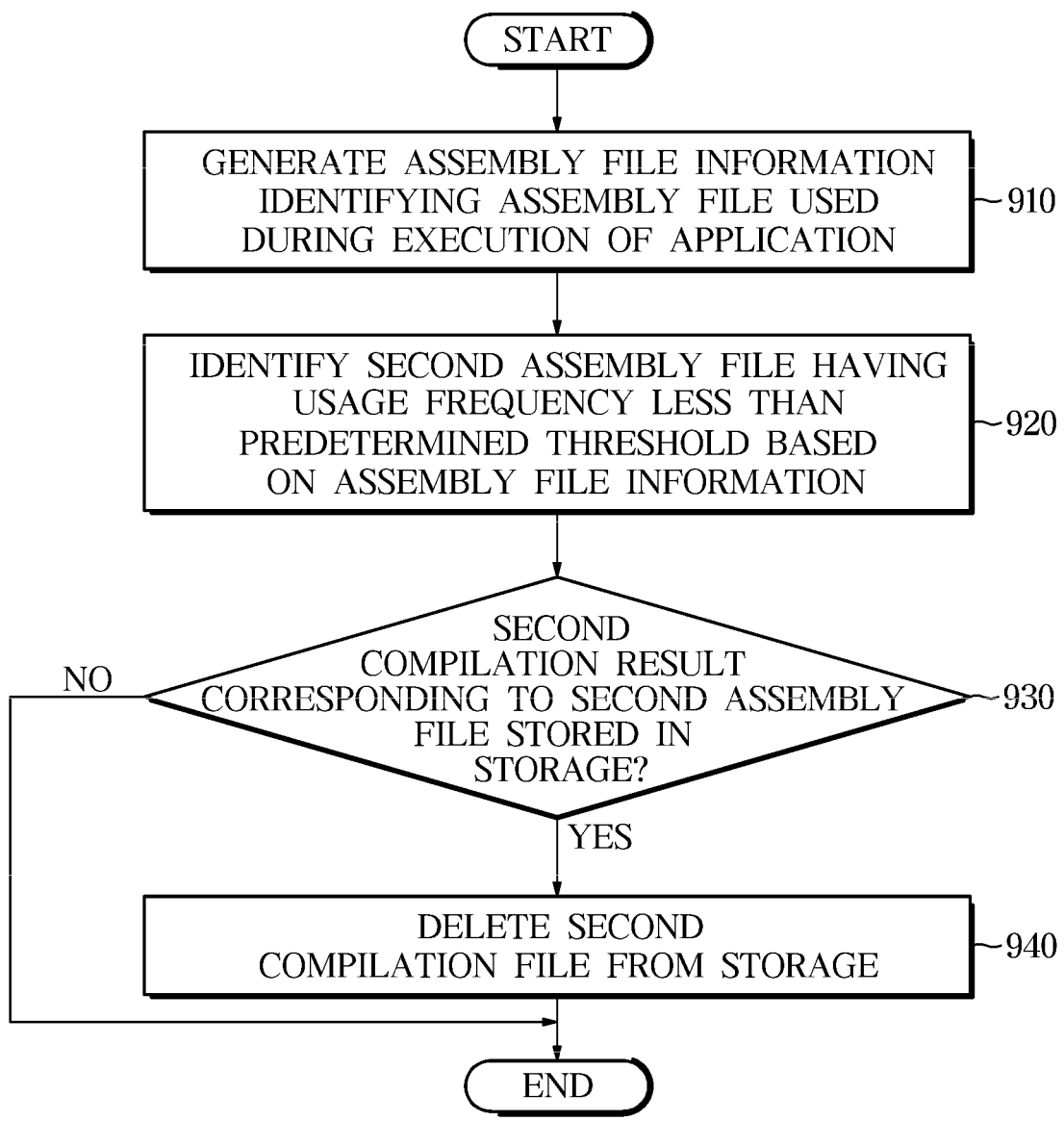
FIG. 9 is a flowchart illustrating a case of updating a compilation result stored in a storage in a control method of a UE, according to an embodiment.

FIG. 9 is a flowchart illustrating a case of updating a compilation result stored in the storage 130 in a control method of the UE 100, according to an embodiment.

Referring to FIG. 9, the controller 120 of the UE 100 may generate assembly file information that identifies an assembly file used during execution of an application, in operation 910.

In an embodiment, the controller 120 of the UE 100 may identify a second assembly file having a usage frequency that is less than a predetermined threshold based on the assembly file information, in operation 920.

The predetermined threshold may correspond to the usage frequency during a certain period identified as not being frequently used by the user, and may be set in advance during a design stage or set in advance by the user via the input device 140.

Accordingly, the controller 120 may identify an application and the second assembly file in the source code of the application having the usage frequency that is less than the predetermined threshold. In other words, the controller 120 may identify an application and the second assembly file of the application having a low usage frequency based on the application execution history information.

If the controller 120 identifies that a second compilation result corresponding to the second assembly file is stored in the storage 130 in operation 930 (operation 930—YES), then the controller 120 of the UE 100 may delete the second compilation result from the storage 130 in operation 940.

In other words, the controller 120 may identify an assembly file associated with a compilation result stored in the storage 130 that is to be deleted based on the usage frequency of the assembly file, among a plurality of assembly files included in the source code of an application.

As described above, by updating compilation results, such as machine code stored in the storage 130 by taking into account the usage frequency of an application or assembly file by the user, the UE 100 may delete a compilation result of an application or assembly file that has been used less frequently. In this way, the UE 100 to utilize the storage space more adaptively and efficiently.

Figure 10:
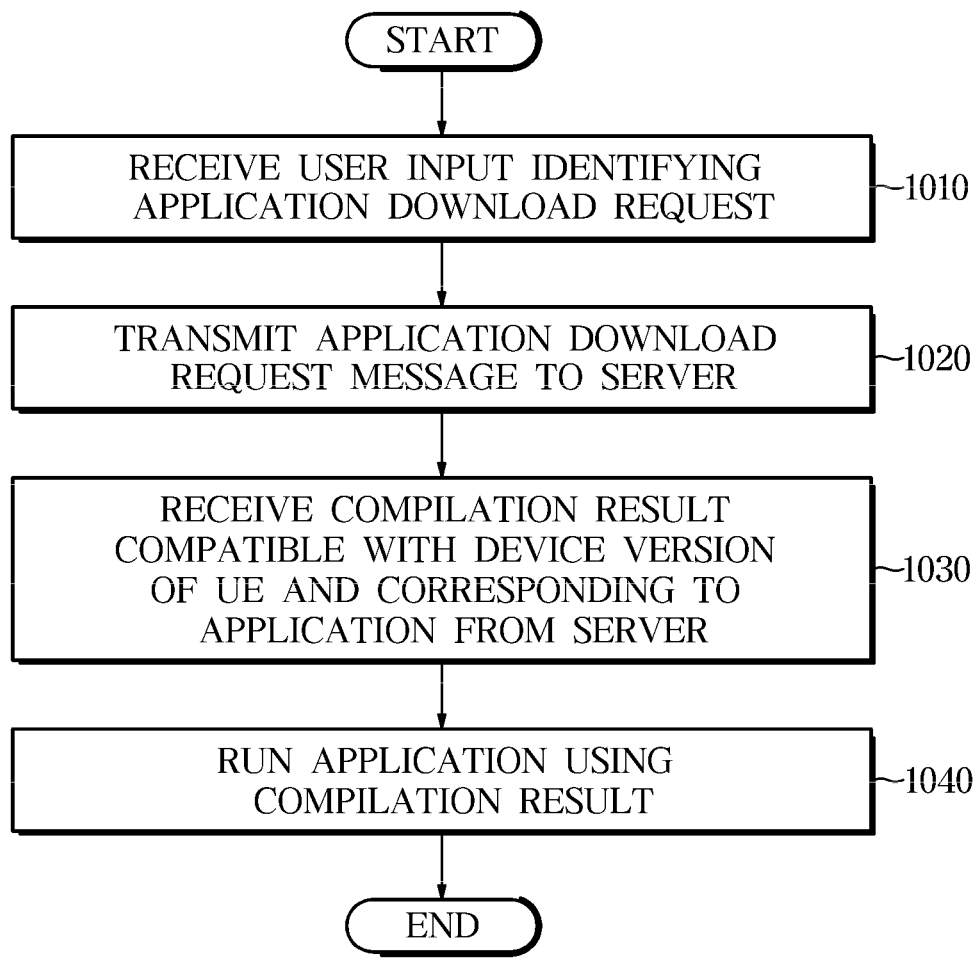
FIG. 10 is a flowchart illustrating a case of providing an application download request to a server in a control method of a UE, according to an embodiment.

FIG. 10 is a flowchart illustrating a case of providing an application download request to the server 200 in a control method of the UE 100, according to an embodiment.

Referring to FIG. 10, the UE 100 may receive a user input that identifies an application download request, in operation 1010.

Specifically, the UE 100 may receive, via the input device 140, the user input that identifies the application download request.

The UE 100 may transmit an application download request message to the server 200, in operation 1020.

Specifically, in an embodiment, the controller 120 may control the communication device 110 to transmit an application download request message to the server 200. The application download request message may include a UE identifier identifying the UE 100, device version information of the UE 100, and an application identifier.

In an embodiment, the UE 100 may receive a compilation result from the server 200, which is compatible with the device version of the UE 100 and corresponds to the application, in operation 1030.

Specifically, communication device 110 may receive a compilation result that is compatible with the device version of the UE 100 and that corresponds to an application from the server 200.

The UE 100 may run the application based on the compilation result, in operation 1040.

Specifically, the controller 120 of the UE 100 may run the application based on the compilation result received from the server 200, and may refrain from compiling the source code of the application. Information resulting from the execution of the function of the application may be output through the speaker 150 or the display 160 of the UE 100.

Accordingly, the UE 100 may not be required to compile the source code of the application, and instead may use the compilation result for the application, thereby allowing the application to run more quickly.

That is, to reduce the need for the UE 100 to perform compilation, the server 200 may perform AOT compilation of the application, thereby allowing the controller 120 and the storage 130 of the UE 100 to be more adaptively and efficiently utilized, and thereby conserving the resources otherwise allocated for compilation.

Furthermore, the controller 120 of the UE 100 may identify an assembly file to be AOT compiled using the compilation result for the application corresponding to the application download request message among the plurality of assembly files of the application. In other words, the compilation result may represent an assembly file to be AOT compiled.

Figure 11:
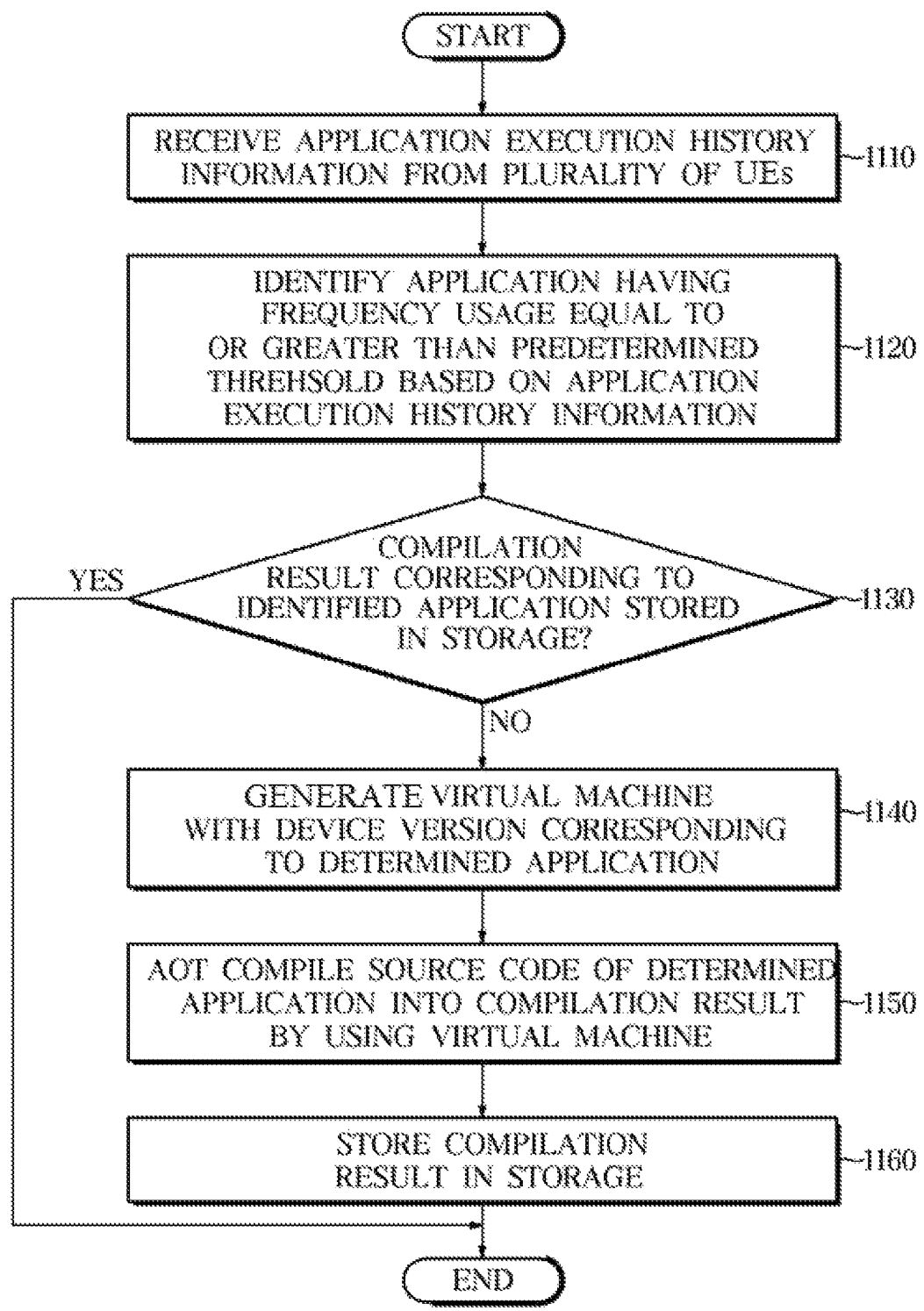
FIG. 11 is a flowchart illustrating a case of performing AOT compilation in a control method of a server, according to an embodiment.

FIG. 11 is a flowchart illustrating a case of performing AOT compilation in a control method of the server 200, according to an embodiment.

Referring to FIG. 11, the server 200 may receive application execution history information from the plurality of UEs 100, in operation 1110.

The application execution history information may include at least one of an application identifier for an application, assembly file information associated with an assembly file, or device version information of the UE 100.

Specifically, each of the plurality of UEs 100 may generate the application execution history information including at least one of an application identifier for an application, assembly file information representing an assembly file of the application, which corresponds to a function, or device version information of the UE 100.

The device version information may include information associated with a firmware version, a middleware version, or an API version of the UE 100.

Accordingly, the server 200 may obtain the application execution history information from the plurality of UEs 100. Specifically, the server 200 may obtain information associated with an application that is executed by the UE, and information associated with an assembly file used by the UE 100 from each of the plurality of UEs 100.

In an embodiment, the server 200 may identify an application having a usage frequency that is equal to or greater than the predetermined threshold based on the application execution history information, in operation 1120. In other words, the server 200 may identify an application that is used frequently as a target to be AOT compiled, based on the application execution history information.

Furthermore, the controller 220 of the server 200 may identify an application that is a target of AOT compilation by comparing the usage frequency of each application corresponding to the same application identifier and device version information with the predetermined threshold.

Specifically, the controller 220 may classify a plurality of applications based on application type and device version information of the UE 100 in which the application runs, and compare the usage frequencies of each of the classified applications with the predetermined threshold.

In this way, the controller 220 may identify whether AOT compilation is to be performed for each application with the same application type and the same device version information.

If the controller 220 identifies that a compilation result corresponding to the identified application is not stored in the storage 230 in operation 1130 (operation 1130—NO), then the server 200 may generate a virtual machine (VM) with the device version for the identified application in operation 1140.

In other words, the controller 220 may generate a VM having a device version corresponding to an application identified as a target to be AOT compiled, based on the device version information corresponding to the identified application.

Specifically, the controller 220 may identify a device version of a UE 100 in which the application identified as a target to be AOT compiled may run, based on the device version information, and generate a VM having the identified device version.

For example, the controller 220 may generate a VM having a firmware version, a middleware version, an API version, and/or a kernel version for the identified application.

The VM may refer to a virtualization of a physical machine in software that provides the same operating environment as the device version, such as the firmware version, middleware version, API version, and kernel version for the identified application.

That is, the VM may refer to a virtual resource that is implemented in software by being assigned a processor, a memory, a disk I/O, etc., and that has the same operating environment as the device version.

In an embodiment, the server 200 may obtain a compilation result by using the VM to AOT compile source code of the identified application, in operation 1150.

Specifically, the controller 220 may identify an assembly file with a usage frequency that is equal to or greater than the predetermined threshold among a plurality of assembly files included in source code of an application identified based on the assembly file information, and obtain a compilation result for the application by AOT compiling the assembly file.

Specifically, the controller 220 may AOT compile an application with a high usage frequency based on the application execution history information received from the plurality of UEs 100 into a compilation result, such as machine code of the application.

In addition to obtaining the compilation result, such as machine code of the application by AOT compiling the entire source code of the application, the controller 220 may also obtain a compilation result for the application by AOT compiling an assembly file with a high usage frequency in the source code of the application. The latter compilation result may include machine code corresponding to some of the plurality of assembly files included in the source code of the application.

The controller 220 may perform AOT compilation that generates the same result as compilation in the UE 100 having the same device version as the virtual machine, and the compilation result generated in the VM may be compatible with the UE 100 having the same device version as the VM.

In other words, the controller 220 of the server 200 may use the VM to produce a compilation result to be compatible with the device version.

In an embodiment, the server 200 may store the compilation result in the storage 230, in operation 1160. The stored compilation result may be transmitted to the UE 100 upon reception of a download request message from the UE 100.

If the controller 220 identifies that a compilation result corresponding to the identified application is stored in the storage 230 in operation 1130 (operation 1130—YES), then the server 200 may refrain from generating a VM.

Figure 12:
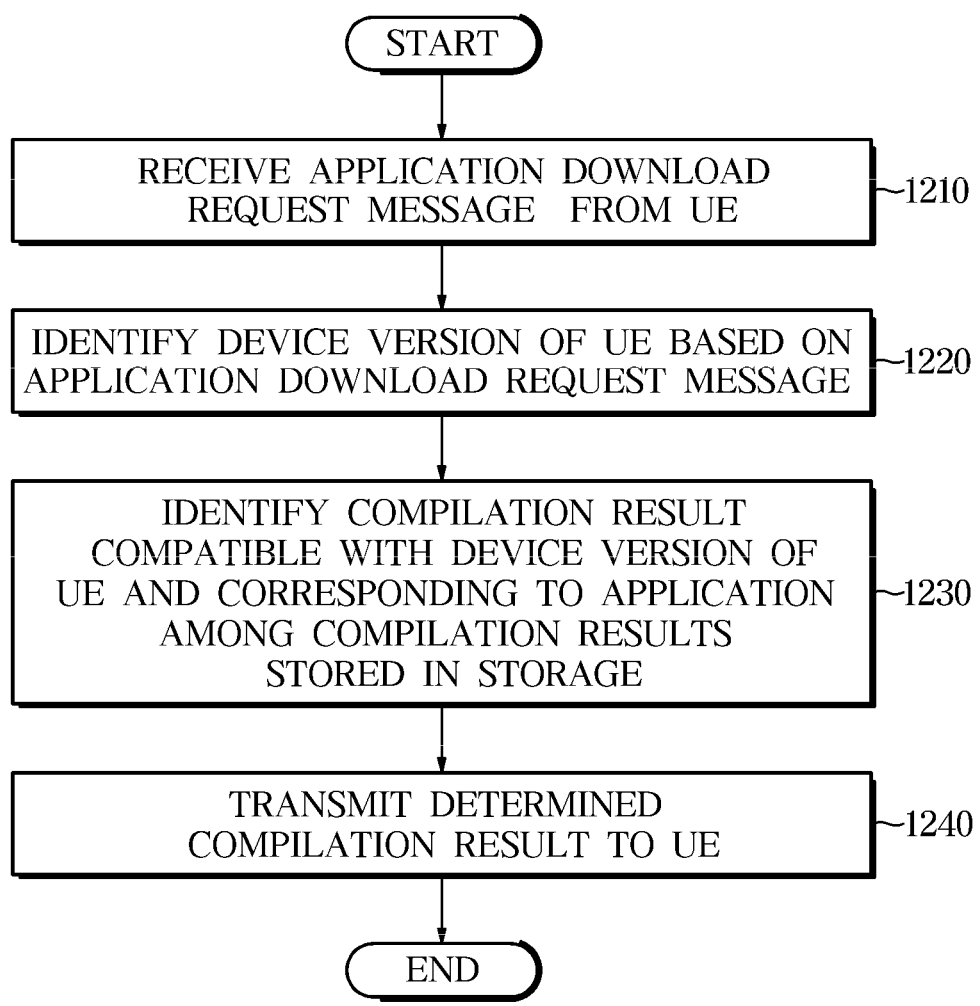
FIG. 12 is a flowchart illustrating a case of sending a compilation result to a UE in a control method of a server, according to an embodiment.

FIG. 12 is a flowchart illustrating a case of sending a compilation result to the UE 100 in a control method of the server 200, according to an embodiment.

Referring to FIG. 12, the server 200 may receive an application download request message from the UE 100, in operation 1210.

Specifically, in an embodiment, the communication device 210 may receive the application download request message from the UE 100. The application download request message may include a UE identifier that identifies the UE 100, device version information of the UE 100, and an application identifier.

In an embodiment, the server 200 may identify the device version of the UE 100 based on the application download request message, in operation 1220. Specifically, the server 200 may identify a device version such as a firmware version, a middleware version, an API version, a kernel version, etc., of the UE 100 that sent the application download request message, based on the device version information of the UE 100 included in the application download request message.

In an embodiment, the server 200 may identify a compilation result that is compatible with the device version of the UE 100 and that corresponds to the application, in operation 1230.

Specifically, based on the identified device version of the UE 100, the controller 220 of the server 200 may identify a compilation result generated by a VM having the device version of the UE 100 that sent the application download request message.

The VM having the same device version as the UE 100 may perform AOT compilation that generates the same result as compilation by the UE 100, and the compilation result generated in the VM may be compatible with the UE 100 having the same device version as the VM.

In this case, the controller 220 may identify a compilation result corresponding to an application requested by the UE 100 based on the application identifier included in the application download request message.

In an embodiment, the server 200 may transmit the identified compilation result to the UE 100, in operation 1240.

Specifically, the controller 220 of the server 200 may control the communication device 210 to transmit the identified compilation result to the UE 100 that sent the application download request message. The controller 220 may identify the UE 100 that sent the download request message based on the UE identifier included in the application download request message.

Accordingly, the UE 100 may not be required to compile the source code of the application, and instead may use the compilation result for the application, thereby allowing the application to run more quickly.

That is, to reduce the need for the UE 100 to perform compilation, the server 200 may perform AOT compilation of the application, thereby allowing the controller 120 and the storage 130 of the UE 100 to be more adaptively and efficiently utilized, and thereby conserving the resources otherwise allocated for compilation.

Furthermore, the controller 120 of the UE 100 may identify an assembly file to be AOT compiled using the compilation result for the application corresponding to the application download request message among the plurality of assembly files of the application. In other words, the compilation result may represent an assembly file to be AOT compiled.

Meanwhile, the embodiments of the disclosure may be implemented in the form of a non-transitory computer-readable medium configured to store instructions to be executed by a computer. The instructions may be stored in the form of program code, and when executed by a processor, may generate program modules to perform operations of the embodiments of the disclosure. The recording medium may correspond to a non-transitory computer-readable recording medium.

The non-transitory computer-readable recording medium includes any type of recording medium having data stored thereon that may be thereafter read by a computer. For example, the non-transitory computer-readable recording medium may be a ROM, a RAM, a magnetic tape, a magnetic disk, a flash memory, an optical data storage device, etc.

According to embodiments of the disclosure, a UE, a server, a control method of the UE, and a control method of the server may be provided to efficiently use storage space of the UE by performing AOT compilation based on the usage frequency of an application and function by a user and managing the AOT compiled machine code.

The embodiments have been described above, but a person of ordinary skill in the art should understand and appreciate that various modifications can be made without departing the scope of the disclosure. Thus, it should be apparent to those of ordinary skill in the art that the scope of the present disclosure is defined by the following claims.

What is claimed is:

1. A user equipment (UE) comprising:
a storage; and
a processor configured to:
identify a first assembly file, among a plurality of assembly files of a first application, having a first usage frequency that is equal to or greater than a predetermined threshold, the first application having the first assembly file and a second assembly file;
execute a virtual machine (VM) to process the first application having a bytecode format;

ahead-of-time (AOT) compile, using the VM, the first assembly file based on the first assembly file having the first usage frequency that is equal to or greater than the predetermined threshold;

obtain a first compilation result based on AOT compiling the first assembly file;

store the first compilation result in the storage; and execute the first application by using the first compilation result stored in the storage and a second compilation result obtained by just-in-time (JIT) compiling the second assembly file corresponding to a particular function, in response to receiving an execute request of the first application and based on identifying the second compilation result of the second assembly file.

2. The UE of claim 1, wherein the processor is configured to:

based on receiving a user request to execute the particular function among a plurality of functions of the first application while executing the first application, identify whether the second compilation result of the second assembly file corresponding to the particular function is stored in the storage.

3. The UE of claim 2, wherein the processor is configured to: execute the first application using the second compilation result of the second assembly file corresponding to the particular function based on identifying that the second compilation result is stored in the storage.

4. The UE of claim 1, wherein the processor is configured to:

based on receiving a user request to execute a function of the first application that does not correspond to the second compilation result stored in the storage while executing the first application, JIT compile the second assembly file that corresponds to the function using the VM that executes the first application.

5. The UE of claim 1, wherein the processor is configured to:

identify the second assembly file, among the plurality of assembly files of the first application, having a second usage frequency that is less than the predetermined threshold; and remove the second compilation result corresponding to the second assembly file from the storage.

6. The UE of claim 1, further comprising:

a communication device configured to communicate with a server, wherein the processor is configured to control the communication device to transmit application execution history information including at least one of an application identifier, assembly file information identifying an assembly file used by the UE, or device version information of the UE to the server, based on executing the first application.

7. The UE of claim 6, wherein the device version information comprises at least one of a firmware version, a middleware version, or an application programming interface (API) version of the UE.

8. The UE of claim 6, wherein the processor is configured to:

control the communication device to transmit an application download request message for a second application to the server; and receive information associated with compilation of the second application that is compatible with a device version of the UE based on the application download request message.

9. The UE of claim 8, wherein the processor is configured to:

identify a third assembly file, among a plurality of assembly files of the second application, based on the information associated with compilation of the second application; and AOT compile the third assembly file.

10. A server comprising:

a storage;

a communication device configured to communicate with a plurality of user equipments (UEs) via a network; and a processor configured to:

receive application execution history information from the plurality of UEs;

identify an application having a usage frequency that is equal to or greater than a predetermined threshold based on the application execution history information;

execute a virtual machine (VM) to process the application having a bytecode format;

ahead-of-time (AOT) compile, using the VM, source code of the application into a compilation result based on the usage frequency being equal to or greater than the predetermined threshold;

obtain a compilation result based of AOT compiling the source code of the application; and store the compilation result in the storage.

11. The server of claim 10, wherein the application execution history information comprises at least one of an application identifier of the application, assembly file information associated with an assembly file of the application, or device version information of a UE that is configured to execute the application.

12. The server of claim 11, wherein the device version information comprises at least one of a firmware version, a middleware version, or an application programming interface (API) version of the UE that is configured to execute the application.

13. The server of claim 11, wherein the processor is configured to:

identify an assembly file, among a plurality of assembly files of the application, having another usage frequency equal to or greater than another predetermined threshold based on the assembly file information; and AOT compile the assembly file.

14. The server of claim 11, wherein the processor is configured to:

compare usage frequencies of a plurality of applications corresponding to a same application identifier and a same device version with the predetermined threshold;

identify the application based on comparing the usage frequencies;

generate the VM having the same device version corresponding to the application based on device version information corresponding to the application; and obtain the compilation result that is compatible with the same device version by using the VM.

15. The server of claim 14, wherein the processor is configured to:

receive, via the communication device, an application download request message for the application from at least one UE; and control the communication device to transmit the compilation result that is compatible with the device version of the at least one UE and corresponding to the application to the at least one UE.

16. A control method of a user equipment (UE) comprising a storage and a communication device configured to communicate with a server, the control method comprising:
- identifying a first assembly file, among a plurality of assembly files of a first application, having a usage frequency that is equal to greater than a predetermined threshold, the first application having the first assembly file and a second assembly file;
- executing a virtual machine (VM) to process the first application having a bytecode format;
- ahead-of-time (AOT) compiling, using the VM, the first assembly file based on the usage frequency being equal to or greater than the predetermined threshold;
- obtaining a first compilation result based on AOT compiling the first assembly file;
- storing the first compilation result in the storage; and
- executing the first application by using the first compilation result stored in the storage and
- a second compilation result obtained by just-in-time (JIT) compiling the second assembly file corresponding to a particular function, in response to receiving an execute request of the first application and based on identifying the second compilation result of the second assembly file.

17. The control method of claim 16, further comprising:
- based on receiving a user request to execute the particular function among a plurality of functions of the first application while executing the first application, identifying whether the second compilation result of the second assembly file corresponding to the particular function is stored in the storage.

18. The control method of claim 17, wherein the executing of the first application comprises:
- executing the first application using the second compilation result of the second assembly file corresponding to the particular function based on identifying that the second compilation result being stored in the storage.

19. The control method of claim 16, further comprising:
- generating the VM configured to perform the AOT compilation based on the first application having a bytecode format; and
- performing JIT compilation by using the VM that executes the first application, based on receiving a user request to execute a function that does not correspond to a compilation result stored in the storage while executing the first application.

* * * * *